United States Patent [19]
Lucey

[11] Patent Number: 5,982,879
[45] Date of Patent: Nov. 9, 1999

[54] TELEPHONE HEADSET AMPLIFIER AND METHOD OF OPERATION

[75] Inventor: Robert E. Lucey, Sudbury, Mass.

[73] Assignee: Unex Corporation, Chelmsford, Mass.

[21] Appl. No.: 07/862,777

[22] Filed: Apr. 3, 1992

[51] Int. Cl.$^6$ .................................................. H04M 1/00
[52] U.S. Cl. ............................................. 379/387; 379/309
[58] Field of Search ...................................... 379/387, 395, 379/214, 113, 388, 267, 266

[56] References Cited

U.S. PATENT DOCUMENTS

| | | | |
|---|---|---|---|
| 3,571,518 | 3/1971 | Chipman et al. | 179/27 |
| 3,851,111 | 11/1974 | Young | 179/51 R |
| 4,048,452 | 9/1977 | Oehring et al. | 179/27 |
| 4,197,430 | 4/1980 | Dowden | 179/27 |
| 4,321,429 | 3/1982 | Trakatsuki et al. | 379/387 |
| 4,400,587 | 8/1983 | Taylor et al. | 179/27 D |
| 4,406,927 | 9/1983 | Pommer, II | 379/387 |
| 4,449,017 | 5/1984 | Burke et al. | 379/387 |
| 4,488,006 | 12/1984 | Essig et al. | 379/387 |
| 4,562,310 | 12/1985 | Watters et al. | 179/100 R |
| 4,620,066 | 10/1986 | Bushnell et al. | 179/27 D |
| 4,672,663 | 6/1987 | Tomasi | 379/388 |
| 4,682,354 | 7/1987 | Vanacore | 379/211 |
| 4,951,310 | 8/1990 | Honda et al. | 379/266 |
| 4,953,207 | 8/1990 | Van Dongen et al. | 379/395 |
| 5,062,103 | 10/1991 | Davidson et al. | 370/58.1 |
| 5,073,890 | 12/1991 | Danielsen | 370/58.2 |
| 5,226,077 | 7/1993 | Lynn et al. | 379/395 |

*Primary Examiner*—Daniel S. Hunter
*Attorney, Agent, or Firm*—Weingarten, Schurgin, Gagnebin & Hayes LLP

[57] ABSTRACT

An amplifier in a telephone call station which is capable of indicating to a telephone call distribution system whether a microphone headset is in electrical communication with the telephone call station. The amplifier simulates being physically disconnected from the telephone call distribution system when the microphone is disconnected from the amplifier thus informing the telephone call distribution system to redirect telephone calls originally destined for that telephone call station.

2 Claims, 4 Drawing Sheets

TELEPHONE HEADSET AMPLIFIER AND METHOD OF OPERATION

FIELD OF THE INVENTION

The invention relates to the field of telephone communication device and more particularly to the field of telephone headset amplifiers.

BACKGROUND OF THE INVENTION

Telephone call distribution systems, such as those which queue and distribute telephone calls to a number of operators or service personnel, typically distribute the next call in the queue to the next available operator by simply detecting which communication line to an operator is not in use. To distinguish the case where a line to a telephone call station is not being used because the operator is available to answer the call, from the case where a line is not being used because there is no operator present at the telephone call station to answer a call, the telephone call distribution system typically makes use of the headset amplifier which is present at each station.

Generally, each telephone call station in the telephone call distribution system includes a removable amplifier which is used to amplify signals to and from a telephone headset. An operator who is leaving his or her call station unplugs the headset amplifier from the telephone call station console. The removal of the amplifier is detected by the telephone call station which serves to notify the telephone call distribution system that no operator is present at the telephone call station console. This method of detecting whether an operator is present at a telephone call distribution station not only requires that each operator have his or her own headset, but also requires that each operator has his or her own headset amplifier. This arrangement results in significant equipment costs, particularly in view of the relatively short life of headsets.

The present invention relates to a means for indicating that an operator has left his or her station without removing the headset amplifier associated with a telephone call station.

SUMMARY OF THE INVENTION

The invention relates to an amplifier in a telephone call station of a telephone call distribution system which is capable of indicating to the telephone call station whether a microphone is in electrical communication with the telephone call station. The amplifier simulates being physically disconnected from the telephone call distribution system when the headset is disconnected from the amplifier thus informing the telephone call distribution system to redirect telephone calls originally destined for that telephone call station.

In one embodiment, the amplifier simulates being disconnected from the telephone call station, when the headset including a microphone is disconnected from the amplifier, in response to detecting a change in standby current passing through the microphone.

In another embodiment, the amplifier simulates being disconnected from the telephone call station, when the headset is disconnected from the amplifier, in response to detecting a change in the voltage drop in the microphone circuit.

In yet another embodiment, the amplifier simulates being disconnected from the telephone call station, when the headset is disconnected from the amplifier, in response to detecting a change in the current passing through the speaker of the headset.

BRIEF DESCRIPTION OF THE DRAWING

These and other features and advantages of the invention will be more readily understood in view of the accompanying specification and drawings in which.

DESCRIPTION OF THE PREFERRED EMBODIMENT

Figure 1:
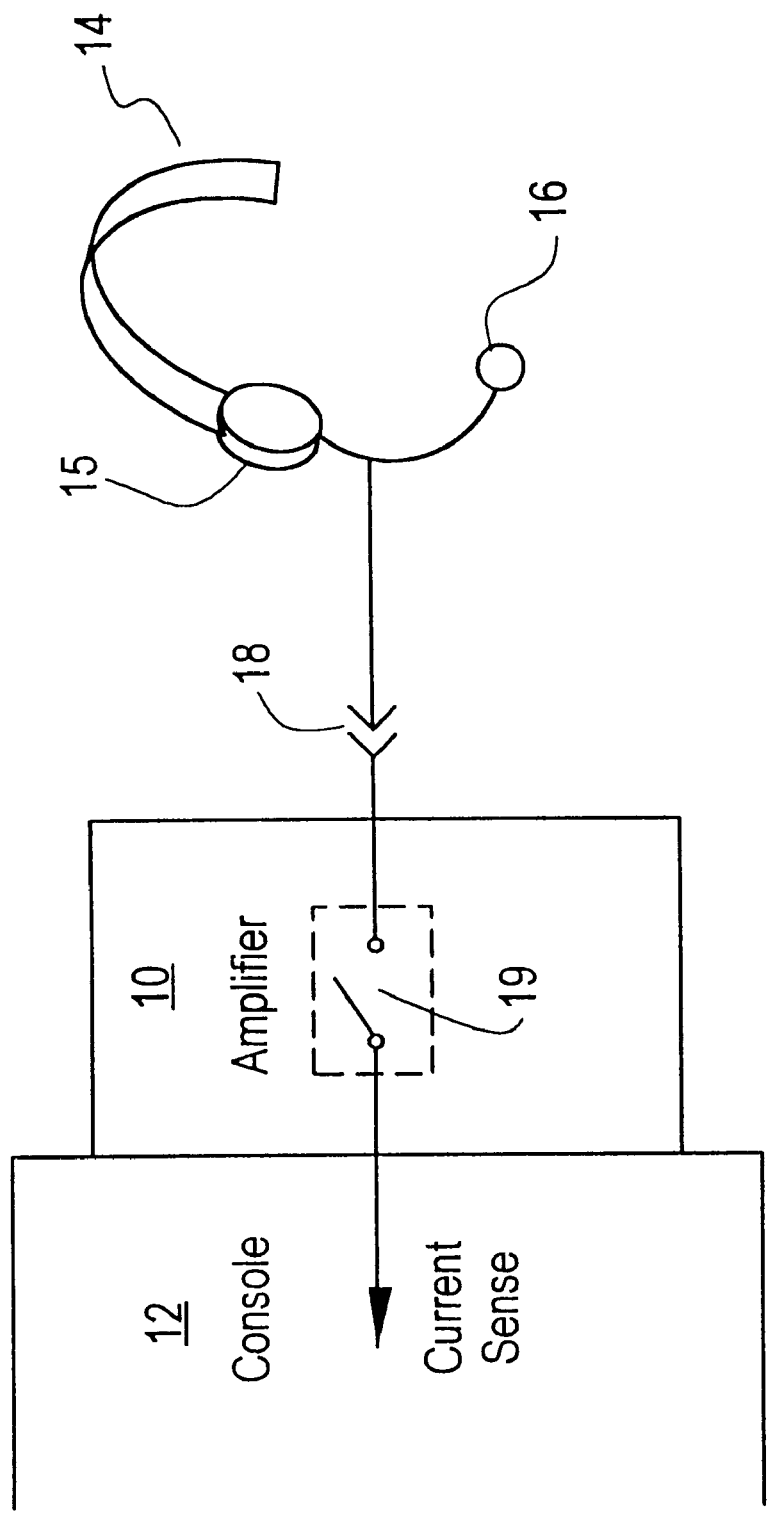
FIG. 1 is a block diagram of an embodiment of the amplifier of the invention in communication with a telephone call station.

In brief overview, FIG. 1 illustrates an embodiment of an amplifier 10 which is capable of simulating being physically disconnected from a telephone call station console 12 when a headset 14, including a speaker 15 and microphone 16, is disconnected from the amplifier 10. In the embodiment shown, the headset 14 is removably connectable, by way of a jack 18, to the amplifier 10 of the telephone call station console 12. The amplifier 10 senses the current flowing through the microphone 16 of the headset 14 and supplies power to a transmitter amplifier (FIG. 2) when the microphone 16 is present.

When the headset 14 is disconnected from the amplifier 10, the microphone 16 is disconnected from the amplifier 10 and the current flow through the microphone 16 ceases. The amplifier 10 detects the loss of current flow through the microphone 16 and simulates being physically disconnected (19) from the telephone call station console 12 by terminating power to the transmitter amplifier. The telephone call station console 12 detects this simulated physical disconnect and is thereby notified that the headset 14 is not connected to the telephone call station console 12.

Figure 2:
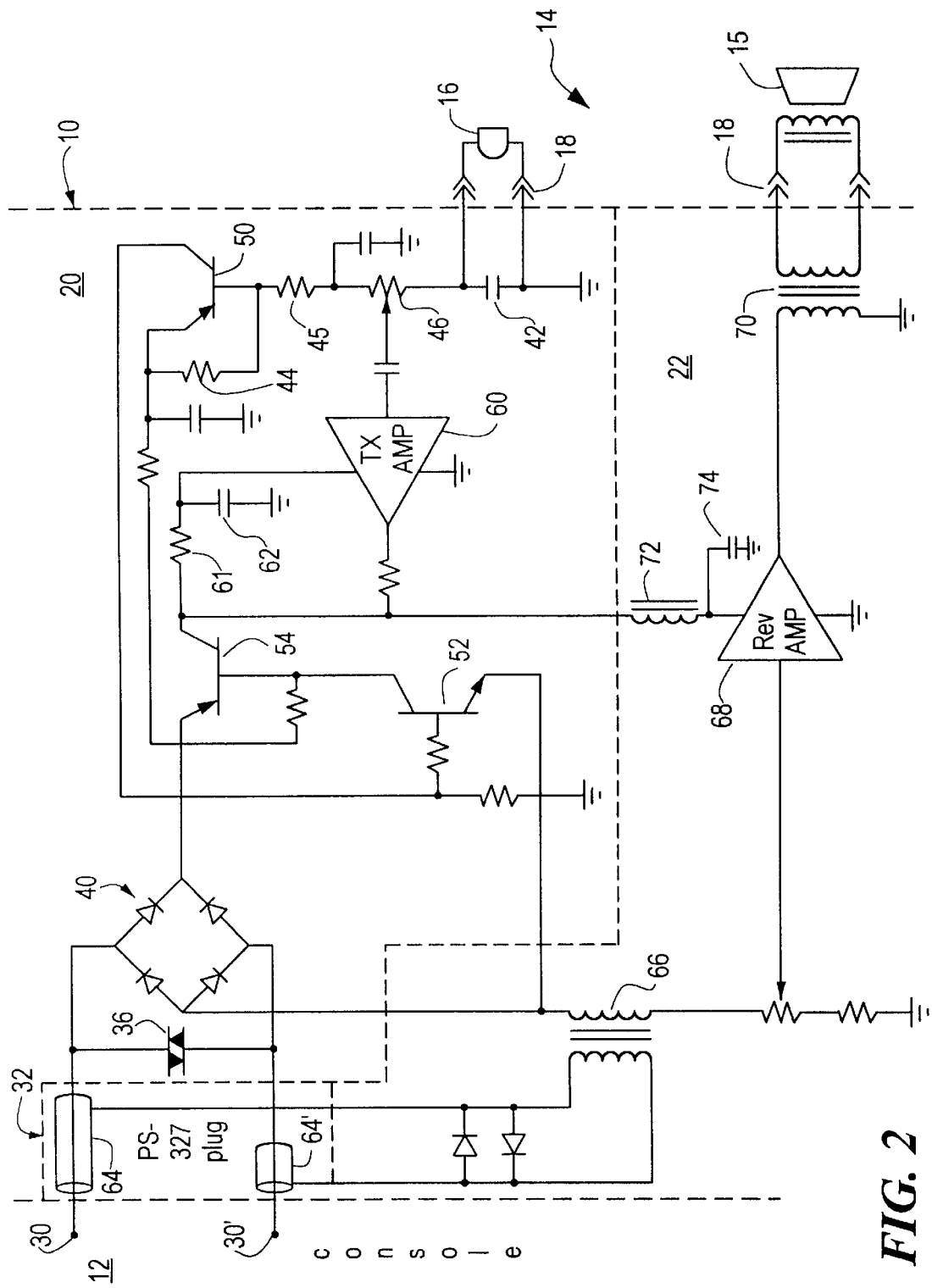
FIG. 2 is a schematic diagram of an embodiment of an amplifier which simulates being disconnected from the telephone call station upon the detection of a change in standby current through the headset microphone.

An embodiment of an amplifier 10 capable of detecting when the headset microphone 16 is disconnected is shown in FIG. 2. The amplifier circuit 10 includes a transmitter portion 20 and a receiver portion 22. Considering each portion separately, current from the console 12 enters the transmitter portion 20 of the amplifier 10 by way of the central tips 30, 30' of a PJ-327 plug 32. A thyristor 36 is connected, as a surge protector, across conductors of the central tips 30, 30' of the PS-327 plug 32. The signals from the central tips 30, 30' of PJ-327 plug 32 are input signals to a bridge 40, that permits a non-polar plug 32 to be used.

When the microphone 16 is plugged into jack 18, a radio frequency interference capacitor 42 is bypassed and standby current flows through the microphone 16. This current flow through fixed resistors 44 and 45 and gain control potentiometer 46, results in current sensing transistor 50 being switched on. Once current sensing transistor 50 switches on, the resulting current flowing from the emitter to the collector of current sensing transistor 50, switches on transistor 52, used as an inverter. The switching on of the inverter transistor 52 in turn switches on DC power transistor 54, supplying DC power to a microphone transmitter amplifier 60 through a resistor 61-capacitor 62 filter combination and supplying DC power to a receiver amplifier 68 through a choke 72-capacitor 74 filter combination. It is this power drain to the transmitter amplifier 60 and the receiver amplifier 68 which is detected by the console 12 and which indicates that the headset 14 is plugged in.

When the headset is unplugged from the jack 18, standby current no longer flows through the microphone 16 and hence current sensing transistor 50 switches off. The switching off of current sensing transistor 50, switches off inverter transistor 52 and hence DC power transistor 54, resulting in the interruption of power to the transmitter amplifier 60. The resulting decrease in power drain is interpreted by the console 12 as if the amplifier 10 were unplugged from the console 12.

Signals to the receiver portion 22 of the amplifier 10 enter the PJ-327 plug 32 from the console 12 by way of the plug sleeves 64, 64'. These signals are coupled by a transformer 66 to the receiver amplifier 68 and then through a second transformer 70 to a speaker 15 of the headset 14. As stated previously, DC voltage is supplied by transistor 54 (which supplies power to the transmitter amplifier 60) to the receiver amplifier 68 through a choke 72-capacitor 74 filter combination. Thus, when the DC power transistor 54 switches off, power not only is interrupted to the transmitter amplifier 60 but also is interrupted to the receiver amplifier 68.

Figure 3:
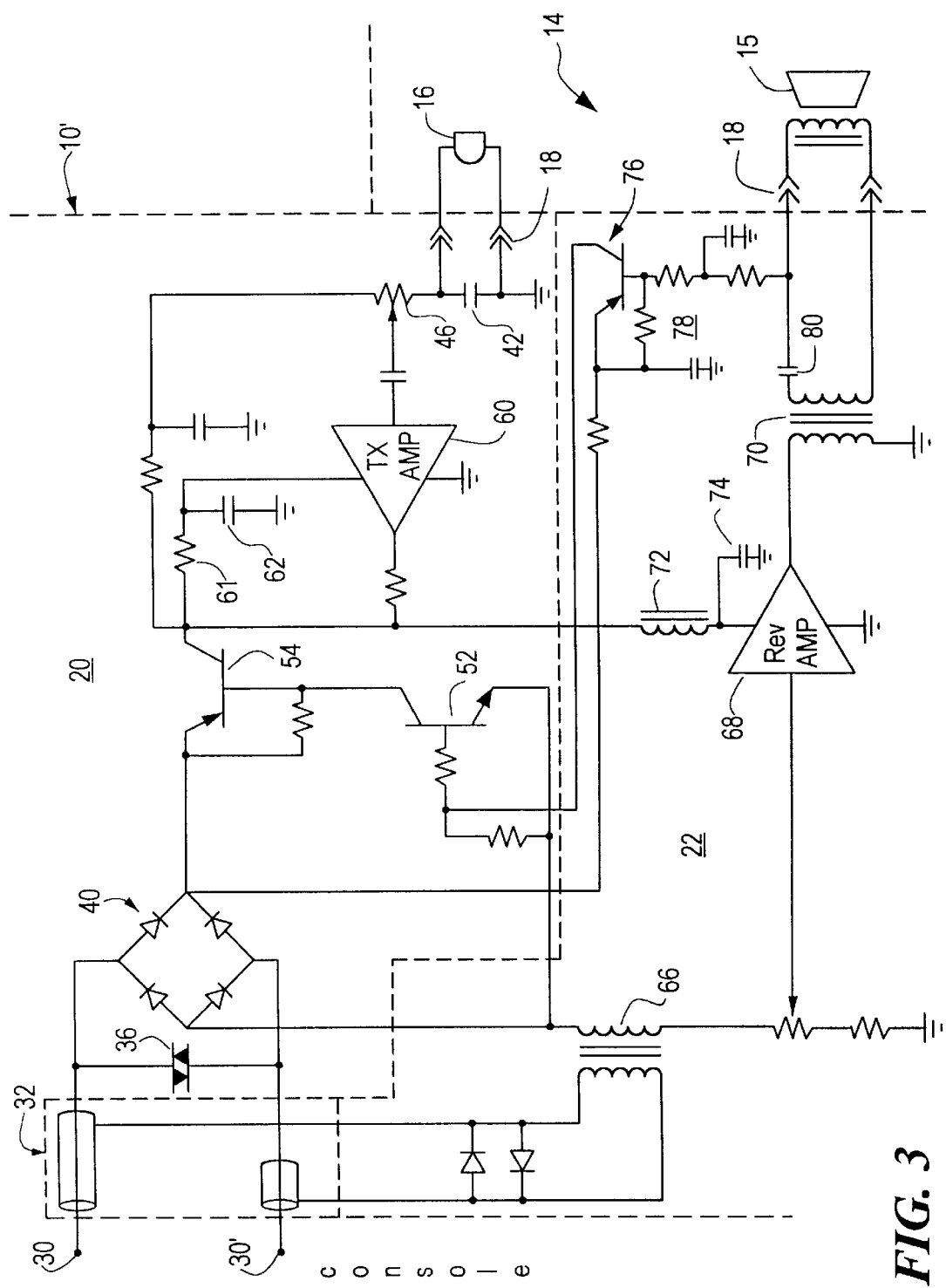
FIG. 3 is a schematic diagram of an embodiment of an amplifier which simulates being disconnected from the telephone call station upon the detection of a change in current through the headset speaker.

FIG. 3 depicts a similar circuit to that shown in FIG. 2, but which, rather than sensing current through the headset microphone 16, when the headset is plugged into the amplifier 10', senses dc current flow through the headset speaker 15, which flows throught the headset speaker 15 in addition to the audio signal. When the speaker 15 is plugged into jack 18 audio signals are passed by capacitor 80 to speaker 15. The current flow results in current sensing transistor 76 being switched on. As previously described, once current sensing transistor 76 switches on, the resulting current flowing from the emitter to the collector of current sensing transistor 76, switches on inverter transistor 52. The switching on of the inverter transistor 52 in turn switches on DC power transistor 54. Again, it is this power drain which is detected by the console 12 and which indicates that the headset 14 is plugged in.

When the headset is unplugged from the jack 18, current no longer flows through the speaker 16 and hence current sensing transistor 76 switches off. The current sensing transistor 76 in turn switches off inverter transistor 52 and hence DC power transistor 54. This resulting decrease in power drain is interpreted by the console 12 as if the amplifier 10' were unplugged from the console 12.

Figure 4:
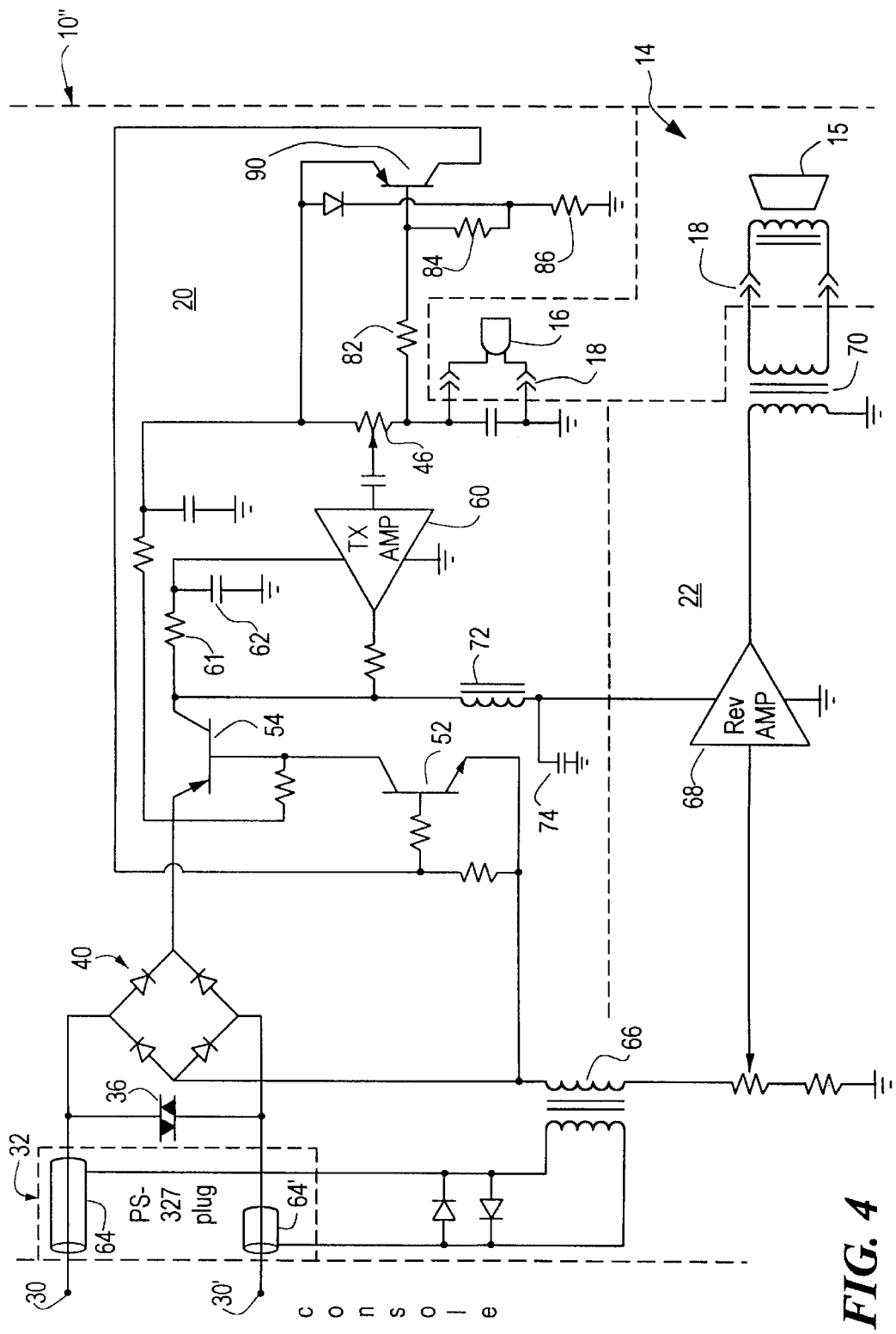
FIG. 4 is a schematic diagram of an embodiment of an amplifier which simulates being disconnected from the telephone call station upon the detection of a change in the voltage drop in the headset microphone circuit.

Although the amplifier circuits 10, 10' just discussed sense the current flowing through the microphone 16 or the speaker 15, respectively, of the headset 14, an alternative embodiment of the amplifier 10" senses a change in the voltage drop in the transmitter portion 20 of the amplifier 10" which occurs when the microphone 16 is plugged into the amplifier 10". Referring to FIG. 4, the circuitry of the amplifier 10" is similar to the circuitry in amplifiers 10 and 10' except that rather than sensing the current flow which bypasses capacitor 42 when microphone 16 is plugged in, the presence of microphone 16 in parallel to ground changes the total resistance of the series of fixed resistors 82, 84, and 86 and gain control potentiometer 46. When the microphone 16 is not plugged in, the total resistance of resistors 82, 84 and 86 and gain control potentiometer 46 results in the biasing of the voltage sensing transistor 90 off, but almost on.

When the microphone 16 is plugged in, the voltage drop across gain control potentiometer 46 changes (in one embodiment by about 0.3V), switching on voltage sensing transistor 90. The switching on of voltage sensing transistor 90, switches on inverter transistor 52 and DC power transistor 54, supplying power to the transmitter amplifier 60 and the receiver amplifier 68. When the microphone 16 is again unplugged, the voltage sensing transistor 90 is again biased barely off, in turn switching off inverter transistor 52 and DC power transistor 54. This results in power being interrupted to both the transmitter amplifier 60 and the receiver amplifier 68 as described previously. It is also possible to use the output of a voltage comparator, configured to sense the voltage drop across the gain control potentiometer 46 when the microphone 16 is plugged in, to control the switching of the inverter transistor 52.

With any embodiment of the amplifier circuit 10, 10', or 10" the console 12 is capable of determining whether a microphone 16 is connected to the jack 18 using only the microphone connections presently available and without requiring additional microphone lines be committed for this purpose. Additionally, the use of one of these embodiments of the amplifier of the invention 10, 10', or 10" provides a mean of determining whether an operator is present at a telephone call station without requiring each operator to have an individual amplifier and headset.

These and other examples of the concept of the invention illustrated above are intended by way of example and the actual scope of the invention is to be determined solely from the following claims.

What is claimed:

1. An amplifier connectable to a telephone system, said telephone system having a means for monitoring when a peripheral device is connected thereto, said monitoring means operating to detect a change in a parameter reflecting current drawn from the telephone system which occurs when the peripheral device is disconnected from the telephone system, said amplifier also being connectable to a telephone headset and including circuit means for amplifying signals passing between the headset and the telephone system, said amplifier further comprising:

means for detecting when the headset is disconnected from said amplifier and generating an output signal in response thereto; and activating means operating in response to said output signal and functioning to change said parameter in a manner to emulate the disconnection of the amplifier from the telephone system even though said amplifier remains connected;

the amplifier further comprising a current drawing element which draws current from the telephone system;

the activating means being operating to change the current drawn from the telephone system by the current drawing element, said activating means further including:

a first switched contact connected to a conductor through which the amplifier draws current;

a second switch contact connected to the current drawing element; and a control input terminal receiving the output signal.

2. An amplifier connectable to a telephone system, said telephone system having a means for monitoring when a peripheral device is connected thereto, said monitoring means operating to detect a change in a parameter which occurs when the peripheral device is disconnected from the telephone system, said amplifier also being connectable to a telephone headset and including circuit means for amplifying signals passing between the headset and the telephone system, said amplifier further comprising:

means for detecting when the headset is disconnected from said amplifier and generating an output signal in response thereto; and activating means operating in response to said output signal and functioning to change said parameter in a manner to emulate the disconnection of the amplifier from the telephone system even through said amplifier remains connected;

a cord interrupted by a connector connecting the headset to the amplifier;

the cord including two additional conductors having a resistance between them, the resistance between the two additional conductors changing when the headset is disconnected from the amplifier; and the detecting means responsive to the resistance between the two additional conductors to provide the output signal when the resistance between the additional conductors changes as a result of the headset being disconnected from the amplifier.

* * * * *